(12) United States Patent
Yu et al.

(10) Patent No.: US 7,764,341 B2
(45) Date of Patent: Jul. 27, 2010

(54) SINGLE UNIT LIQUID CRYSTAL DISPLAY TOUCH PANEL HAVING REDUCED LIGHT LEAKAGE AND METHOD OF FABRICATING THE SAME

(75) Inventors: Hwan Seong Yu, Gyeonggi-do (KR); Yong Ik Bang, Daegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/740,427

(22) Filed: Dec. 22, 2003

(65) Prior Publication Data

US 2004/0141110 A1 Jul. 22, 2004

(30) Foreign Application Priority Data

Dec. 24, 2002 (KR) .................. 10-2002-0083307

(51) Int. Cl.
*G02F 1/1333* (2006.01)
(52) U.S. Cl. .................................................. 349/110
(58) Field of Classification Search ............ 349/12, 349/58, 65, 110; 359/609, 613
See application file for complete search history.

(56) References Cited

U.S. PATENT DOCUMENTS

| | | | |
|---|---|---|---|
| 5,886,759 A * | 3/1999 | Mashino et al. ............ 349/65 |
| 6,074,070 A | 6/2000 | Sasako | |
| 6,177,912 B1 * | 1/2001 | Izumi ...................... 345/1.3 |
| 6,414,741 B2 * | 7/2002 | Hasegawa et al. ......... 349/187 |
| 6,814,452 B2 * | 11/2004 | Kusuda .................. 359/613 |
| 2002/0008832 A1 * | 1/2002 | Hasegawa et al. ......... 349/151 |
| 2002/0109803 A1 | 8/2002 | Yu et al. | |
| 2002/0191131 A1 * | 12/2002 | Ota et al. ................. 349/110 |
| 2003/0067580 A1 * | 4/2003 | Song et al. ............... 349/187 |
| 2003/0090803 A1 | 5/2003 | Kusuda | |

FOREIGN PATENT DOCUMENTS

| | | |
|---|---|---|
| JP | 06-231079 | 8/1994 |
| JP | 09-244814 | 9/1997 |
| JP | 11258618 A * | 9/1999 |
| JP | 2000-222126 | 8/2000 |
| JP | 2001-043020 * | 2/2001 |
| JP | 2001-282454 | 10/2001 |
| JP | 2002-116877 | 4/2002 |
| WO | WO 01/75576 A1 | 10/2001 |

* cited by examiner

*Primary Examiner*—Timothy Rude
(74) *Attorney, Agent, or Firm*—McKenna Long & Aldridge (57) ABSTRACT

Disclosed are a single unit liquid crystal display touch panel and a method of fabricating the same. The single unit liquid crystal display touch panel includes a backlight unit, a liquid crystal display panel on the backlight unit, a touch panel on the liquid crystal display panel, and a light-shielding sidewall at a lateral side of the touch panel to shield a light leakage.

12 Claims, 7 Drawing Sheets

SINGLE UNIT LIQUID CRYSTAL DISPLAY TOUCH PANEL HAVING REDUCED LIGHT LEAKAGE AND METHOD OF FABRICATING THE SAME

This application claims the benefit of the Korean Patent Application No. P2002-083307 filed on Dec. 24, 2002, which is hereby incorporated by reference.

BACKGROUND OF THE INVENTION

1. Field of the Invention

The present invention relates to a liquid crystal display device, and more particularly, to a single unit liquid crystal display touch panel and a method of fabricating the same. Although the present invention is suitable for a wide scope of applications, it is particularly suitable for preventing a light leakage from lateral sides of the liquid crystal touch panel.

2. Discussion of the Related Art

A touch panel has been widely used for inputting a signal to a display surface of the display device without a supplementary input device such as a remote controller. Namely, a touch panel, which is installed on the display surface of a flat panel display device for an electronic pocket book, a liquid crystal display device (LCD), a plasma display panel (PDP), and an electroluminescent (EL) display device or an image display device, such as a cathode ray tube (CRT), so that a user can select information while enjoying an image.

Such touch panels are categorized into a resistive type, a capacitive type, an IR type, a photosensitive type, and the like.

A basic structure of the touch panel includes a transparent upper substrate having an upper electrode formed thereon and a transparent lower substrate having a lower electrode formed thereon to provide a predetermined space between the upper and lower substrates. Hence, once an input device such as a pen or a finger is contacted with a certain spot of the surface of the upper substrate, the upper electrode on the upper substrate is electrically connected to the lower electrode on the lower substrate. A control device then reads a voltage varied by a resistance or capacitance of the contacted spot and locates a coordinate of the contacted spot according to the voltage difference.

A single unit liquid crystal display (LCD) touch panel according to the related art is explained with reference to the attached drawings as follows.

Figure 1:
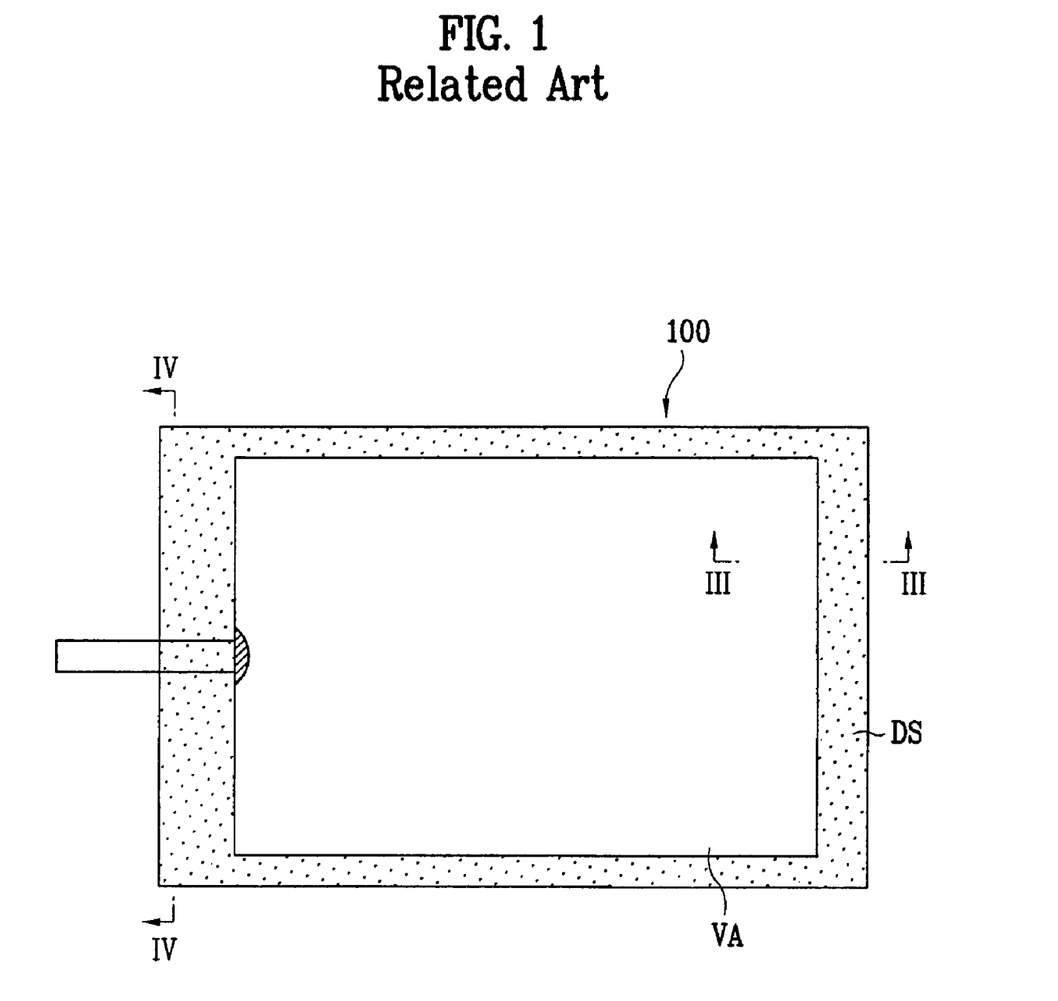
FIG. 1 illustrates a schematic layout of a touch panel according to the related art.
Figure 2A:
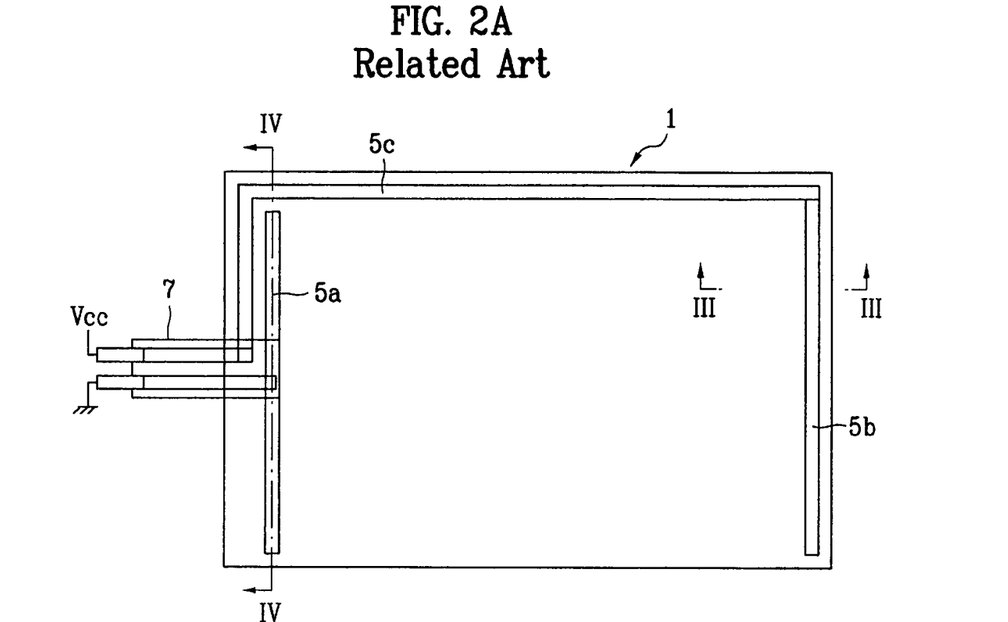
FIG. 2A illustrates a layout of a metal electrode and a signal line on an upper substrate in FIG. 1.
Figure 2B:
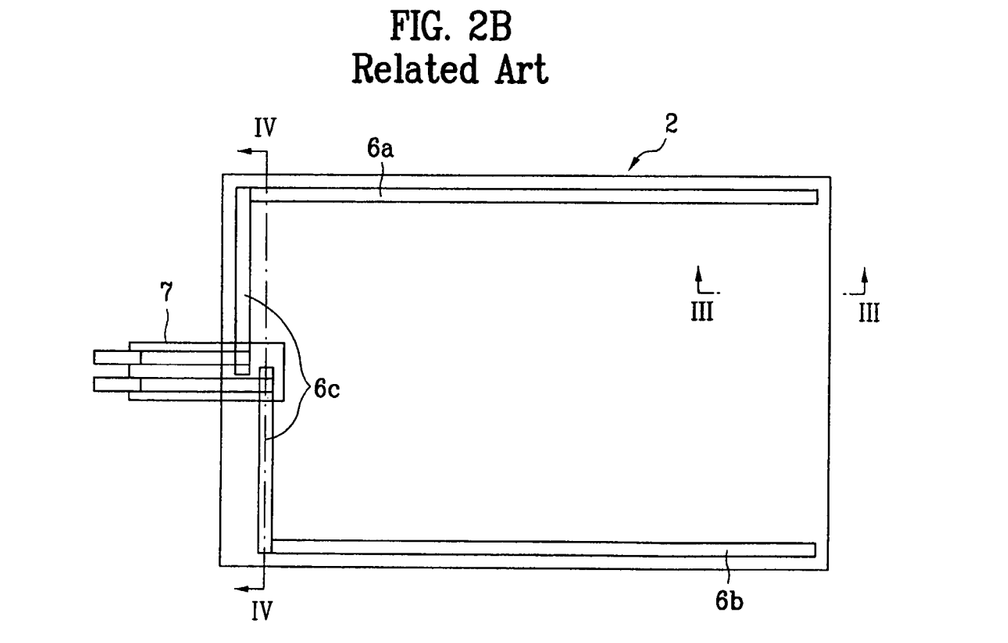
FIG. 2B illustrates a layout of a metal electrode and a signal line on a lower substrate in FIG. 1.
Figure 3:
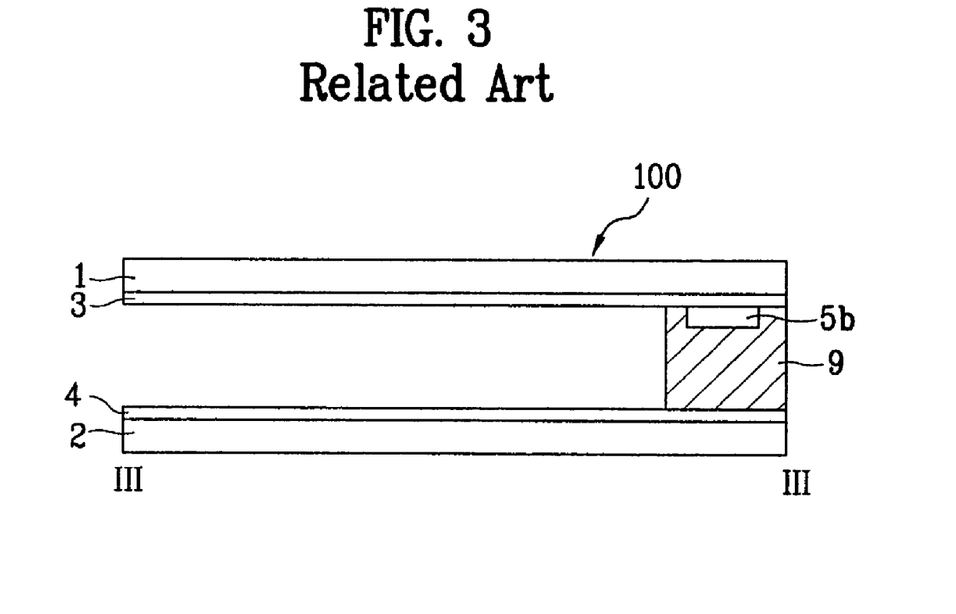
FIG. 3 illustrates a cross-sectional view taken along line III-III in FIG. 1.

FIG. 1 illustrates a schematic layout of a touch panel according to the related art. FIG. 2A illustrates a layout of metal electrodes and a signal line on the upper substrate in FIG. 1, and FIG. 2B illustrates a layout of metal electrodes and a signal line on the lower substrate in FIG. 1. FIG. 3 illustrates a cross-sectional view along line III-III in FIG. 1. And, FIG. 4 illustrates a cross-sectional view taken along line IV-IV in FIG. 1.

Referring to FIG. 1, a touch panel 100 in a liquid crystal display device according to the related art is divided into a viewing area VA corresponding to the display surface of the liquid crystal display device and a dead space DS formed on a peripheral part of the viewing area VA surrounded by the dead space DS.

Figure 4:
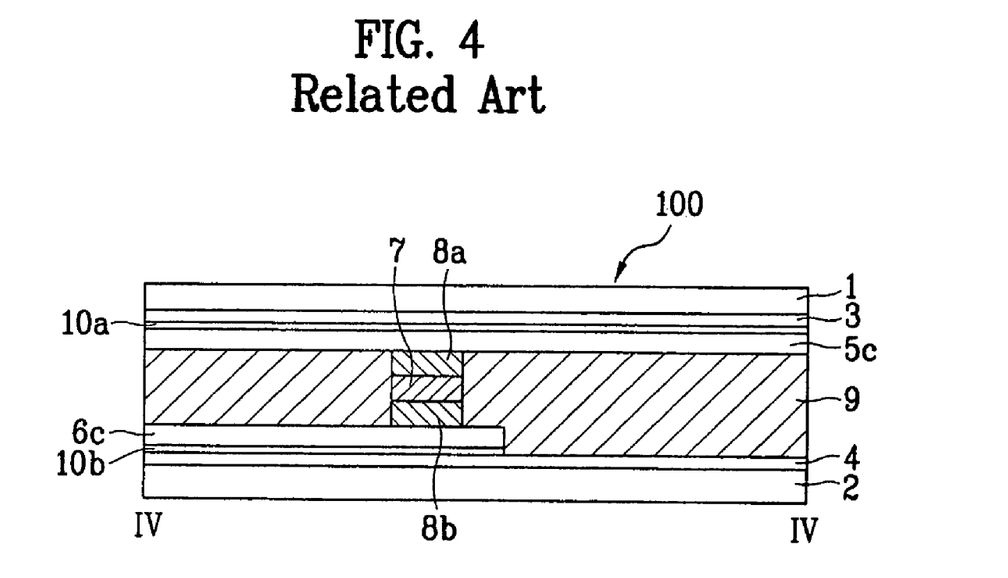
FIG. 4 illustrates a cross-sectional view taken along line IV-IV in FIG. 1.

Referring to FIGS. 3 and 4, transparent electrodes 3 and 4 are formed on the inner sides of upper and lower substrates 1 and 2 of the touch panel 100, respectively. And, the upper and lower substrates 1 and 2 are bonded to each other by an adhesive agent 9 on the dead space DS.

Hence, once a certain spot of the surface of the upper substrate 1 is contacted with a pen, finger, or the like, the transparent electrodes 3 and 4 are contacted with each other at the contacted spot, so that a varied voltage is output by a resistance value at the contacted spot. Since the voltage value varied by the resistance or capacitance value of the contacted spot must be read, a signal line 7 is formed to apply a voltage to the transparent electrodes 3 and 4 as well as read out the voltage value varied with a random contacted spot.

Referring to FIG. 2A, metal electrodes 5a and 5b are formed on the dead space DS of the left and right sides of the upper substrate 1 to be connected to the transparent electrode 3, respectively. And, a metal electrode 5c is formed on the upper or lower side of the dead space DS of the upper substrate 1. In this case, the metal electrodes 5a and 5b are electrically connected to the transparent electrode 3. Although the metal electrode 5c is electrically insulated from the metal electrode 5b, an insulating layer 10a is formed between the electrodes including the transparent and metal electrodes 3 and 5c, so that the metal electrode 5c is electrically insulated from the transparent electrode 3.

Referring to FIG. 2a and FIG. 4, the metal electrodes 5c and 5a are connected to the signal line 7 formed of flexible printed cable (FPC) through a conductive adhesive agent 8a.

Referring to FIG. 2B, metal electrodes 6a and 6b are formed on the dead space DS of the upper and lower sides of the lower substrate 2 to be connected to the transparent electrode 4, respectively. And, a metal electrode 6c is formed on the left side of the dead space DS of the lower substrate 2. In FIG. 4, an insulating layer 10b is formed between the transparent and metal electrodes 4 and 6c, so that the metal electrode 6c is electrically insulated from the transparent electrode 4.

The signal line 7 is connected to the metal electrodes 6a and 6b on the dead space DS via the metal electrode 6c. Namely, the signal line 7 is electrically connected to the metal electrodes 5, 5b, and 6c by the conductive adhesive agents 8a and 8b. The signal line 7 applies a power or a ground voltage Vcc or GND to the transparent electrode 3 or 4 through the metal electrodes 5a, 5b, and 5c or 6a, 6b, and 6c or outputs a voltage output to the transparent electrode 3 or 4 when the upper and lower transparent electrodes 3 and 4 are electrically connected to each other at a random spot.

The metal electrodes 5a, 5b, and 5c or 6a, 6b, and 6c must be separated from the outermost side of the transparent electrode 3 or 4 by about 0.3 to 0.4 millimeters (mm) to prevent a short-circuit.

Thus, the signal line 7 and the metal electrodes 5a, 5c, and 6c are bonded to each other at a portion of the dead-space DS by the conductive adhesive agents 8a and 8b, and the upper and lower substrates 1 and 2 are bonded to each other in the dead space DS excluding for the portion of the dead space DS by a non-conductive adhesive agent 9.

In order to bond the signal line 7 to the metal electrodes 5a, 5c, and 6c, while the conductive adhesive agents 8a and 8b are disposed on the metal electrodes 5a, 5c, and 6c at portions where the signal line 7 is bonded, and the non-conductive adhesive agent 9 is disposed over an area of the dead space DS where the signal line 7 is not be bonded. About 100° C. as well as a pressure is selectively applied to the portions for bonding between the signal line 7 and the metal electrodes 5a, 5c, and 6c, so that the signal line 7 is bonded to the corresponding metal electrodes 5a, 5c, and 6c as soon as the upper and lower substrate 1 and 2 are bonded to each other.

Figure 5:
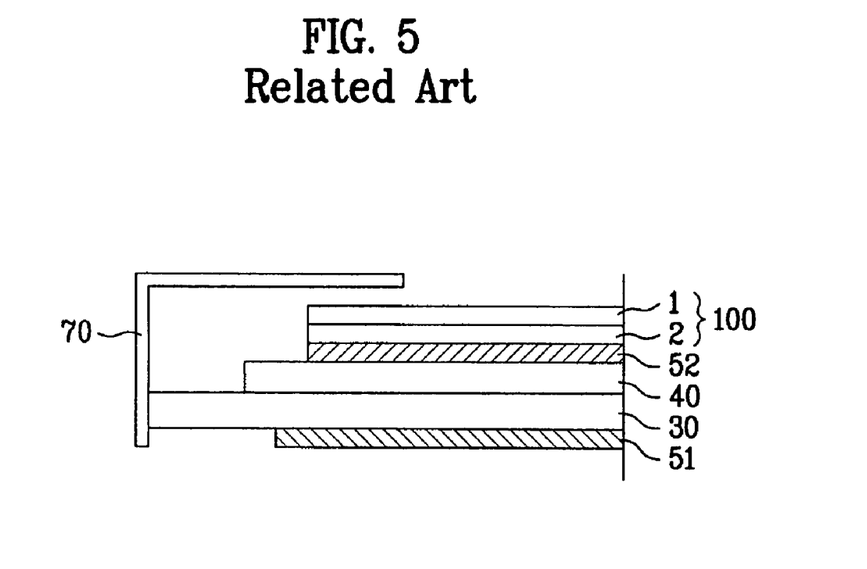
FIG. 5 illustrates a cross-sectional view of a single unit liquid crystal display touch panel according to the related art.

FIG. 5 illustrates a cross-sectional view of a single unit LCD touch panel according to the related art.

Referring to FIG. 5, a single unit LCD touch panel includes a lower polarizing plate 51, a liquid crystal display panel having a lower substrate 30 formed on the lower polarizing plate 51 and an upper substrate 40 formed on the lower substrate 30, an upper polarizing plate 52 formed on the upper substrate 40 of the liquid crystal display panel, a touch panel 100 having a lower substrate 2 formed on the upper polarizing plate 52 and an upper substrate formed on the lower substrate 2. In addition, a case top 70 is formed on sides of the entire structure as described above and an upper circumference of the touch panel 100.

Color filter and thin film transistor arrays are formed on the upper and lower substrates 40 and 30 of the liquid crystal display panel, respectively. And, a liquid crystal layer (not shown) is formed between the substrates 40 and 30.

The components as described in FIGS. 2 to 4 are formed between the upper and lower substrates 1 and 2 of the touch panel 100.

The operation of the above-explained touch panel in liquid crystal display panel according to the related art is explained as follows.

First of all, when a pen, finger, or the like is contacted with a certain spot of the upper substrate 1 of the touch panel 100, the transparent electrodes 3 and 4 are contacted with each other at that spot. In this case, power and ground voltages Vcc and GND are applied to the left and right sides of the transparent electrode 3 through a pair of signal lines printed over the signal line 7 and the metal electrodes 5a, 5b, and 5c, respectively, and a voltage value of the contracted spot is read out through the transparent electrode 4 of the lower substrate 2, the metal electrodes 6a, 6b, and 6c, and a signal line printed under the signal line 7 to locate a coordinate value of the X-axis.

Besides, the power and ground voltages Vcc and GND are applied to upper and lower sides of the transparent electrode 4 through a pair of signal lines printed under the signal line 7 and the metal electrodes 6a, 6b, and 6c, respectively. A voltage value of the contracted spot is read out through the transparent electrode 3 of the upper substrate 1 and the metal electrodes 5a, 5b, and 5c to locate a coordinate value of the Y-axis. Hence, the X-Y coordinate values of the contacted spot are read out to obtain a position of the contacted spot.

Figure 6:
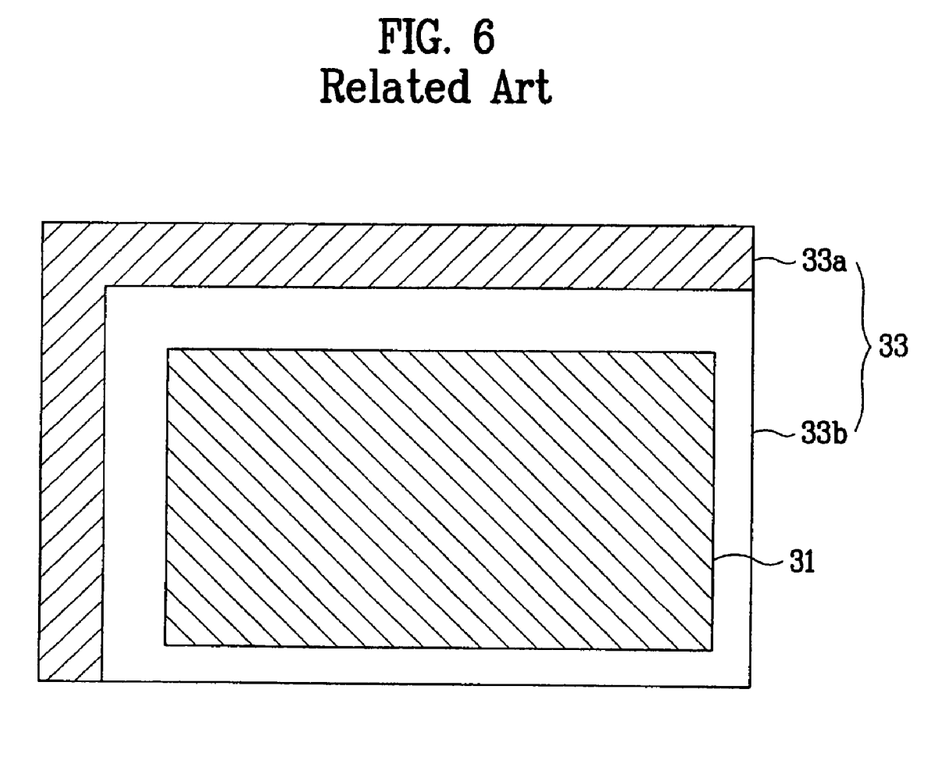
FIG. 6 illustrates a layout of a single unit liquid crystal display touch panel according to the related art, in which the touch panel is divided into respective areas.

FIG. 6 illustrates a layout of the single unit LCD touch panel according to the related art, in which the touch panel is divided into respective areas.

Referring to FIG. 6, a touch panel in a liquid crystal display panel using the liquid crystal display device as a display device has a liquid crystal display panel margin 33a greater than a dead space 33b of the touch panel in general. In this case, the margin 33a of the liquid crystal display panel is grater than that of the touch panel in considering a formation area of gate and data line driving parts formed under the liquid crystal display panel. Hence, the liquid crystal display panel margin 33a becomes a non-active area of the display device where a real circuit cannot be formed. An actual viewing area is an active area 31 of the liquid crystal display device, and this area becomes a display surface.

Problems or disadvantages of the above-explained single unit LCD touch panel according to the related art are explained as follows.

Figure 7:
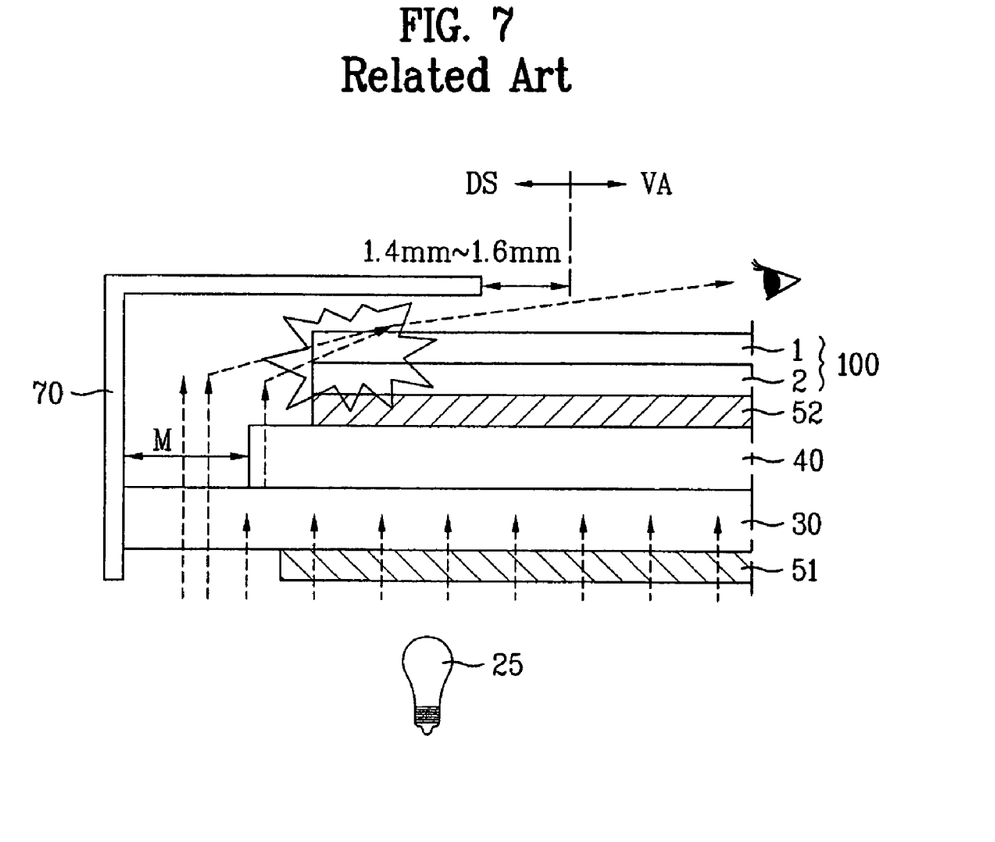
FIG. 7 illustrates a diagram for explaining problems of the touch panel in liquid crystal display panel according to the related art shown in FIG. 5.
Figure 8:
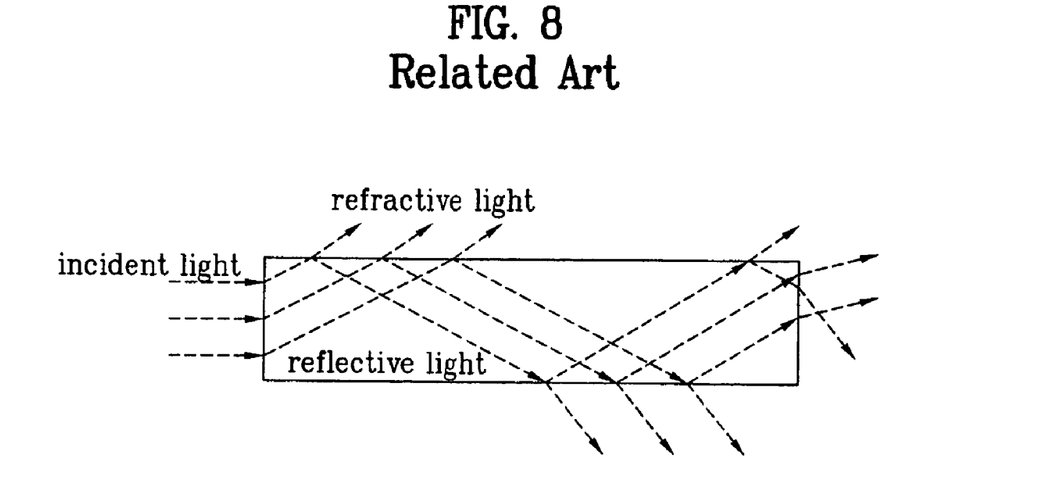
FIG. 8 illustrates a diagram for explaining a principle of light leakage from the touch panel in liquid crystal display panel according to the related art shown in FIG. 5.

FIG. 7 illustrates a diagram for explaining problems of the touch panel in liquid crystal display panel according to the related art in FIG. 5, and FIG. 8 illustrates a diagram for explaining a principle of light leakage from the touch panel in liquid crystal display panel according to the related art in FIG. 5.

Referring to FIG. 7, a single unit LCD touch panel according to the related art includes a touch panel (elements between upper and lower substrates that are not shown in the drawing), which is constituted with the above-described upper and lower substrates 61 and 62, arranged-on the uppermost end, a liquid crystal display panel 30 and 40 under the touch panel, and a backlight unit 25 under the liquid crystal display panel 30. Moreover, a case top 70 is installed to surround the periphery of the touch panel including sides of the touch panel, the liquid crystal display panel 30 and 40, and the backlight unit 25.

The liquid crystal display panel includes an upper substrate having a color filter array formed thereon, a lower substrate 30 having a TFT array formed thereon, and a liquid crystal layer (not shown) injected between the upper and lower substrates 40 and 30. An upper polarizing plate 52 having the same size of the touch panel 60 is formed on the liquid crystal display panel 30 and 40 and a lower polarizing plate 51 is formed under the liquid crystal display panel 30 and 40.

In FIG. 7, the lower substrate 30 of the liquid crystal display panel has a margin M for the upper substrate 40 in considering an area where a driving unit for driving gate and data lines constructing the TFT array will be formed.

In order to minimize the influence on the screen display, the case top 70 is formed on the dead space as a non-viewing area of the touch panel, and has a gap of about 1.4 to 1.6 millimeters (mm) from an actual viewing area.

Hence, a portion of the light, which is indicated by a dotted line arrow, emitted from the backlight unit as an inner light source passes through the area of the margin M to penetrate a corner or lateral side of the touch panel 100, so that a light leakage toward the viewing area VA of the touch panel 100 may be caused.

Namely, when the light progressing in one direction through a first medium runs into a second medium of a transparent component such as the substrates 1 and 2, a refraction occurs at the interface between the first and second media and reflection and refracting keep occurring in progressing in the second medium.

Thus, in the single unit LCD touch panel according to the related art, the refractive or reflective light due to the lateral side and the corner of the touch panel causes the externally observed light leakage from the periphery of the display surface of the touch panel.

SUMMARY OF THE INVENTION

Accordingly, the present invention is directed to a single unit liquid crystal display touch panel and a method of fabricating the same that substantially obviate one or more of problems due to limitations and disadvantages of the related art.

Another object of the present invention is to provide single unit liquid crystal display touch panel and a method of fabricating the same that prevent a light leakage from the periphery of the display surface of the touch panel.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a single unit liquid crystal display touch panel according to the present invention includes a backlight unit, a liquid crystal display panel on the backlight unit, a touch panel on the liquid crystal display panel, and a light-shielding sidewall at a lateral side of the touch panel to shield a light leakage.

The light-shielding sidewall is formed of opaque ink. The light-shielding sidewall is also formed of an opaque dielectric.

The touch panel includes upper and lower substrates having a viewing area and a dead space, the upper and lower substrates facing into each other, first and second transparent electrodes on facing sides of the upper and lower substrates, respectively, at least one electrode in the dead space, and an adhesive agent in the dead space between the upper and lower substrate.

The at least one electrode is formed of a light-shielding material. Also, the at least one electrode is formed of an opaque material.

Herein, the at least one electrode has a width of about 0.1 to 1.3 millimeters (mm).

The adhesive agent is formed of a light-shielding material.

Herein, the single unit liquid crystal display touch panel further includes an upper polarizing plate over the liquid crystal display panel, and a lower polarizing plate under the liquid crystal display panel.

The single unit liquid crystal display touch panel further includes a case supporting the touch panel and the liquid crystal display panel.

An upper part of the case shields the touch panel except a viewing area of the touch panel.

In another aspect of the present invention, a single unit liquid crystal display touch panel includes a backlight unit, a liquid crystal display panel on the backlight unit, a touch panel on the liquid crystal display panel, and a case casing the liquid crystal display panel and the touch panel, and surrounding at least lateral and upper surfaces of the liquid crystal display panel and the touch panel except for a top surface of a viewing area of the touch panel.

The case has a gap from a boundary of the viewing area less than about 1.3 millimeters (mm).

The single unit liquid crystal display touch panel further includes an upper polarizing plate over the liquid crystal display panel, and a lower polarizing plate under the liquid crystal display panel.

In another aspect of the present invention, a single unit liquid crystal display touch panel includes a touch panel, a liquid crystal display panel under the touch panel, and a backlight unit under the liquid crystal display panel, wherein the touch panel includes upper and lower substrates having a viewing area and a dead space around the viewing area, the upper and lower substrates facing into each other, first and second transparent electrodes on confronting sides of the upper and lower substrate, respectively, at least one metal electrode on each of the first and second transparent electrodes at an outermost periphery of the dead space, and an adhesive agent formed in the dead space between the upper and lower substrates to bond the upper and lower substrates to each other.

The metal electrode is recessed from a lateral side of the touch panel by about 0.1 to 0.4 millimeters (mm).

The metal electrode has a width of about 0.1 to 1.3 millimeters (mm). Herein, the metal electrode is formed of an opaque metal.

In a further aspect of the present invention, a single unit liquid crystal display touch panel includes a touch panel, a liquid crystal display panel under the touch panel, a backlight unit under the liquid crystal display panel, and a case supporting at least the touch panel and the liquid crystal display panel, wherein the touch panel includes upper and lower substrates having a viewing area and a dead space around the viewing area, the upper and lower substrates facing into each other, first and second transparent electrodes on facing sides of the upper and lower substrate, respectively, at least one metal electrode in the dead space, and a light-shielding member in the dead space between the upper and lower substrates.

The light-shielding member is an adhesive agent bonding the upper and lower substrates to each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 9:
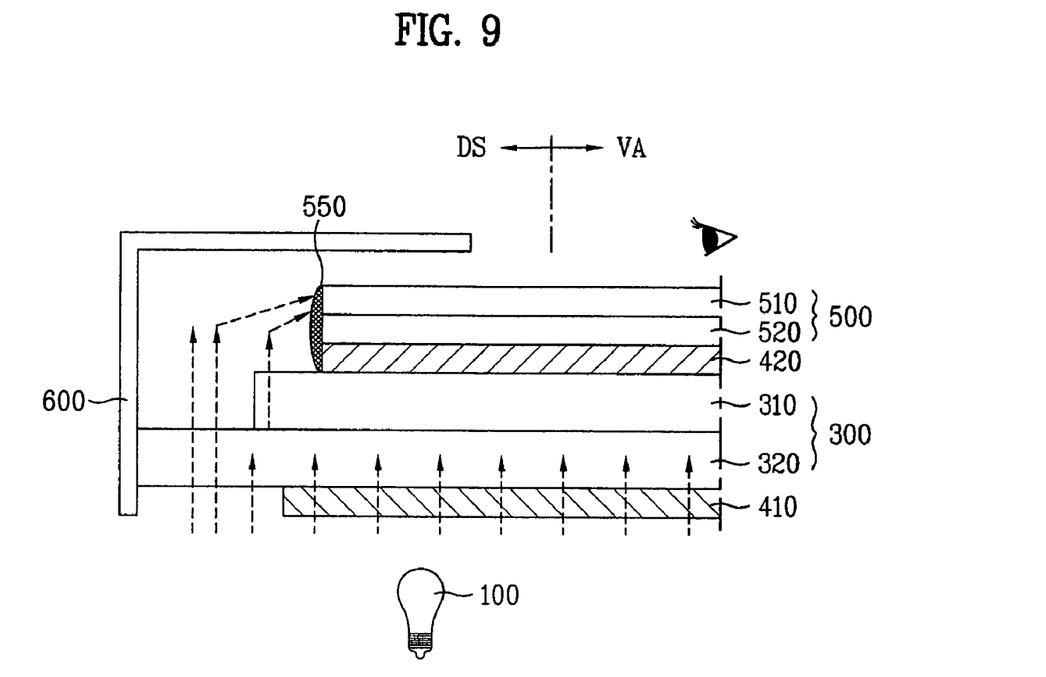
FIG. 9 illustrates a cross-sectional view of a single unit liquid crystal display touch panel according to a first embodiment of the present invention.

FIG. 9 illustrates a cross-sectional view of a single unit liquid crystal display touch panel according to a first embodiment of the present invention.

Referring to FIG. 9, a single unit liquid crystal display (LCD) touch panel according to a first embodiment of the present invention includes a touch panel 500 having a viewing area VA and a dead space DS around the viewing area VA, a liquid crystal display panel 300 under the touch panel 500 to display a video signal according to a touch operation, a backlight unit 100 irradiating light to the liquid crystal display panel 300, a case top 600 casing the touch panel 500 and the liquid crystal display panel 300, and an opaque sidewall spacer 550 formed on a lateral side of the touch panel 500.

The touch panel 500 includes upper and lower substrates 510 and 520 facing into each other, first and second transparent electrodes (not shown) formed on the surfaces of the upper and lower substrates 510 and 520, respectively, a plurality of metal electrodes (not shown) formed in the dead space DS to apply a voltage signal, and a double-faced adhesive agent (not shown) bonding the upper and lower substrates 510 and 520 to each other. In this case, a portion of the double-faced adhesive-agent corresponding to the metal electrodes formed on the upper and lower substrates 510 and 520 is electrically insulated, while the rest portion is formed of an electrically conductive material.

Each of the metal electrodes is formed of an opaque metal and has a width of about 0.1 to 1.3 millimeters (mm). The metal electrodes are formed at a position recessed from the outermost side of the dead space DS by about 0.1 to 0.3 millimeters (mm).

The opaque sidewall spacer 550 is formed to contact four sides of the touch panel 500 and formed of a light-shielding material such as ink, opaque dielectric, and the like.

The liquid crystal display panel 300 includes a lower substrate 320 having a TFT array formed underneath and an upper substrate 310 having a color filter array formed thereon, and liquid crystal (not shown) is injected between the lower and upper substrates 320 and 310 to display a video signal.

In this case, a lateral side of the lower substrate 320 is formed longer than that of the upper substrate 310, which is to consider an area where a printed circuit board (PCB) including driving units for driving gate and data lines on the TFT panel at the side area of the lower substrate 320.

A lower polarizing plate 410, as shown in FIG. 9, is further formed under the lower substrate 320 and an upper polarizing plate 420 is formed on the upper surface of the upper substrate 310, so that a direction of the internal transmitting light by the backlight unit 100 is defined.

The backlight unit 100 as a light source of the liquid crystal display panel 300 is installed under the liquid crystal display panel 300 to irradiate light with an on-off operation. A backlit liquid crystal display device requires the backlight unit 100, while a reflective liquid crystal display device does not require the backlight unit 100.

The case top 600 cases the liquid crystal display panel 300, the touch panel 500, the backlight unit 100, and the like, and is formed across a portion of the dead space DS of the touch panel to surround the lateral sides of the liquid crystal display panel 300, the touch panel 500, and the backlight unit 100.

Figure 10:
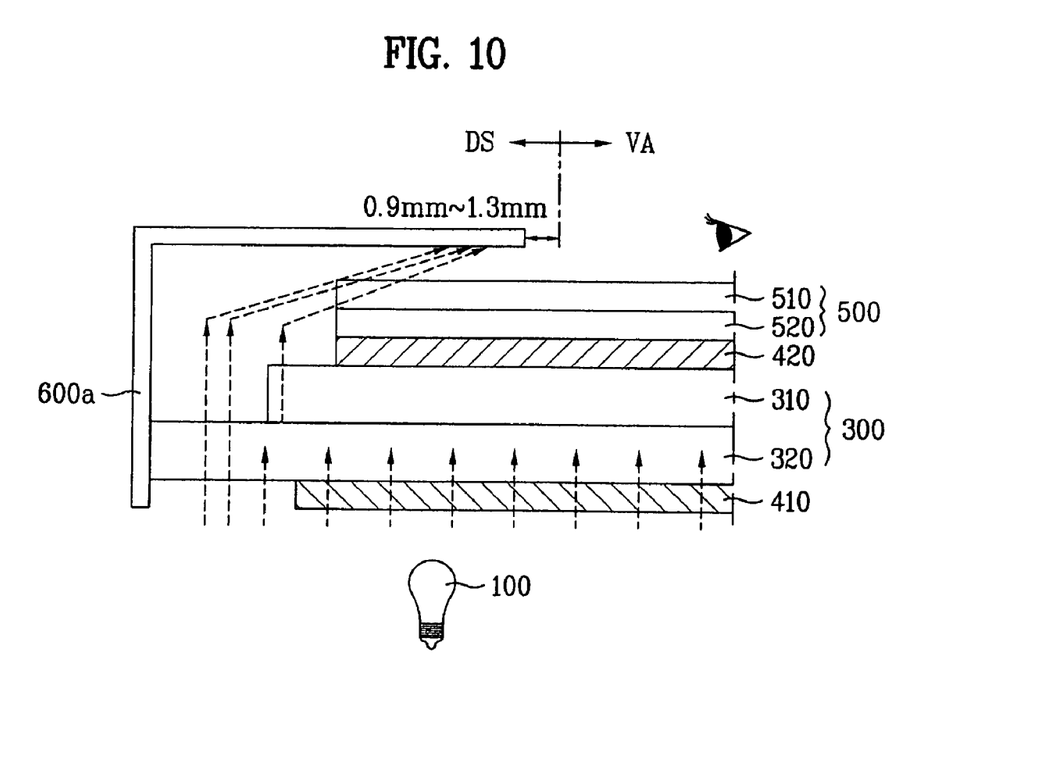
FIG. 10 illustrates a cross-sectional view of a single unit liquid crystal display touch panel according to a second embodiment of the present invention.

FIG. 10 illustrates a cross-sectional view of a single unit liquid crystal display touch panel according to a second embodiment of the present invention, in which the same reference numbers will be used throughout the first and second embodiments to refer to the same or like parts.

Referring to FIG. 10, compared to the first embodiment of the present invention shown in FIG. 9, a single unit LCD touch panel according a second embodiment of the present invention includes a case top 600a casing the touch panel 500, the liquid crystal display panel 300, and the backlight unit 100. The case top 600a extends toward the viewing area VA as close as possible. In the second embodiment of the present invention, an upper tip of the case top 600a is extended to correspond to the area where a light leakage is generated in the lateral side of the touch panel 500. Hence, the light refracted or reflected at the lateral side of the touch panel 500 is blocked out by the extended portion of the case top 600a within the range of the dead space DS to display a video signal on the viewing area VA.

In this case, a distance between the upper tip of the case top 600a and the boundary of the viewing area VA is determined to be 0.9 to 1.3 millimeters (mm), which is smaller than 1.4 to 1.6 millimeters (mm) of the related art. Besides, there is a required distance or interval between the viewing area VA and the case top 600a to consider a tolerance or margin for cutting the case top 600a.

A second embodiment of the present invention is similar to the first embodiment of the present invention. However, unlike the first embodiment, the opaque sidewall spacer is not used and the upper tip of the case top 600a is extended in the second embodiment.

Figure 11:
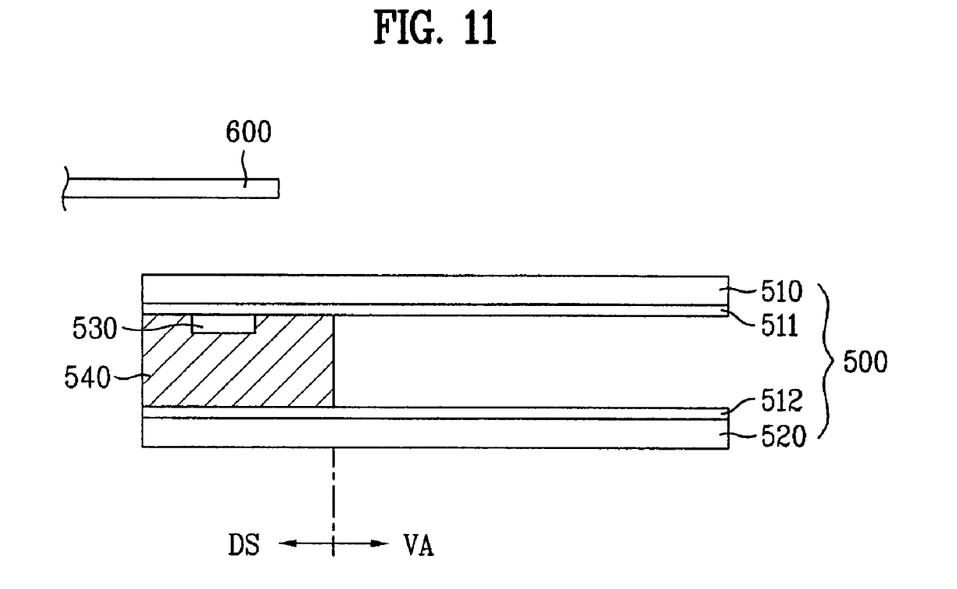
FIG. 11 illustrates a cross-sectional view of a single unit liquid crystal display touch panel according to a third embodiment of the present invention.

FIG. 11 illustrates a cross-sectional view of a single unit liquid crystal display touch panel according to a third embodiment of the present invention, in which the same reference numbers will be used throughout the first to third second embodiments to refer to the same or like parts.

Referring to FIG. 11, a single unit LCD touch panel according to a third embodiment of the present invention includes a touch panel 500 at the uppermost end, a liquid crystal display panel 300 under the touch panel 500, a backlight unit under the liquid crystal display panel 300, a case top 600 or 600a outside the liquid crystal display panel 300 and the backlight unit. Such a constitution is similar to the first or second embodiment of the present invention, but has a different structure of the touch panel 500 as follows.

In FIG. 11, the touch panel 500 includes upper and lower substrates 510 and 520 having a viewing area VA and a dead space DS surrounding the viewing area VA to face into each other, first and second transparent electrodes 511 and 522 formed on facing sides of the upper and lower substrates 510 and 520, respectively, a plurality of metal electrodes (only the metal electrodes on the upper substrate are shown in the drawing) formed in the dead space DS, and an adhesive agent 540 of an opaque material having a prescribed dotted space surrounding the metal electrodes 530 in the dead space DS between the upper and lower substrates 510 and 520 to bond the upper and lower substrates 510 and 520 to each other.

The metal electrodes 530 shown in FIG. 11 represent the metal electrodes formed on the upper substrate 510 only. On four sides of the touch panel 500, only one metal electrode can be formed for applying a voltage signal on the upper or lower substrate 510 or 520. Alternatively, a metal electrode for applying a voltage signal and another metal electrode as a line, may be formed on each of the upper and lower substrates 510 and 520.

In this case, the adhesive agent 540 is formed of an opaque material, and an opaque insulating layer (not shown) can be formed between the upper and lower substrates 510 and 520 depending upon how the metal electrode is formed. Hence, the light incident on the lateral side of the touch panel 500 is blocked out by the opaque insulating layer, thereby preventing a light leakage.

Therefore, the third embodiment of the present invention uses the opaque material in forming the adhesive agent in the dead space for bonding the upper and lower substrates since the light leakage occurs from the dead space, thereby preventing the light leakage.

Figure 12:
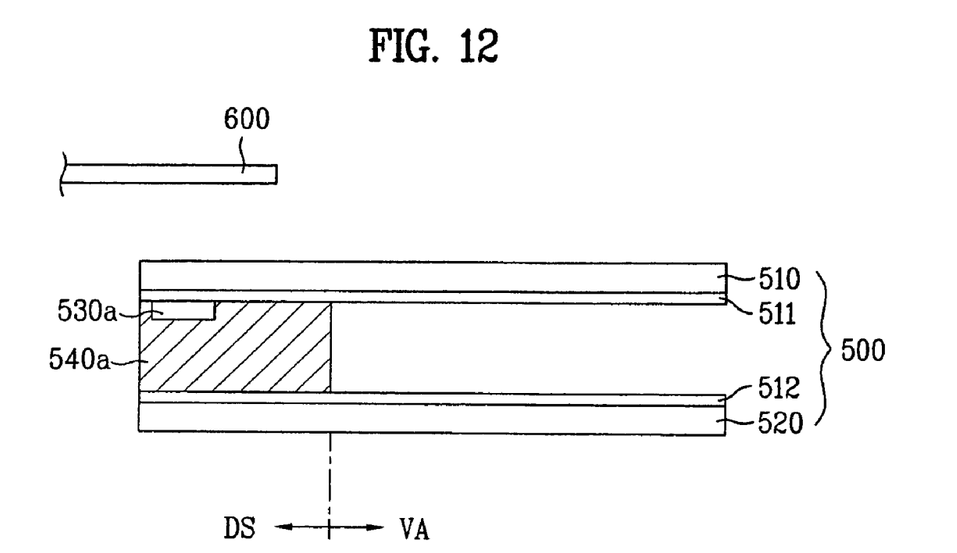
FIG. 12 illustrates a cross-sectional view of a single unit liquid crystal display touch panel according to a fourth embodiment of the present invention.

FIG. 12 illustrates a cross-sectional view of a single unit liquid crystal display touch panel according to a fourth embodiment of the present invention.

Similar to the third embodiment, a single unit LCD touch panel according to a fourth embodiment of the present invention includes a touch panel 500 at the uppermost end, a liquid crystal display panel 300 under the touch panel 500, a backlight unit under the liquid crystal display panel 300, a case top 600 or 600a outside the liquid crystal display panel 300 and the backlight unit. Such a constitution is similar to the first to third embodiments of the present invention, but has a different detailed structure of the touch panel 500 as follows.

Referring to FIG. 11, the touch panel 500 of the fourth embodiment of the present invent-ion includes upper and lower substrates 510 and 520 having a viewing area VA and a dead space DS surrounding the viewing area VA to face into each other, first and second transparent electrodes 511 and 522 formed on the surfaces of the upper and lower substrates 510 and 520, respectively, a plurality of metal electrodes 530a (only one metal electrode is shown in the drawing) recessed from the outermost side of the dead space DS by about 0.1 to 0.4 millimeters (mm), and an adhesive agent 540a in the dead space DS between the upper and lower substrates 510 and 520 to bond the upper and lower substrates 510 and 520 to each other.

In this case, the metal electrode 530a arranged to be spaced apart from the outermost side of the dead space DS by a gap of 0.1 to 0.4 millimeters (mm) to block out the light refracted into the lateral side of the touch panel 500, thereby preventing the light leakage.

The elements of the third and fourth embodiments of the present invention, which are similar to each other, are indicated by using the same reference numbers. The adhesive agent in the fourth embodiment is formed of the opaque material, and the metal electrode on the transparent electrode is formed at the outermost side of the dead space.

The constitutions of the first to fourth embodiments of the present invention to prevent the light leakage are applied to the four edges of the touch panel.

The single unit LCD touch panel according to the present invention has the following advantages or effect.

A light leakage is observed from the lateral side of the touch panel when the touch panel is built as one body of the backlit liquid crystal display device having an inner light source. The light leakage can be prevented by forming a opaque sidewall spacer at the lateral side of the touch panel, extending the case top to be adjacent to the active area, using the double-faced adhesive agent of the opaque material in case of bonding the upper and lower substrates of the touch panel in the dead space, or arranging the metal electrode, which is formed between the upper and lower substrates for applying a signal, at a more peripheral area of the dead space.

It will be apparent to those skilled in the art that various modifications and variations can be made in the single unit liquid crystal display touch panel and the method of fabricating the same of the present invention without departing from the spirit or scope of the inventions. Thus, it is intended that the present invention covers the modifications and variations of this invention provided they come within the scope of the appended claims and their equivalents.

What is claimed is:

1. A single unit liquid crystal display touch panel, comprising: a backlight unit; a liquid crystal display panel on the backlight unit; upper and lower polarizing plates on opposite surfaces of the liquid crystal display panel; a touch panel on the liquid crystal display panel, wherein the touch panel comprises, upper and lower substrates facing each other, and an adhesive agent of a light-shielding material between the upper and lower substrates for bonding the upper and lower substrates; and
a light-shielding layer disposed exclusively on the entire sidewalls of the touch panel and the upper polarizing plate, wherein the entire sidewalls are an entire exterior edge surface of the touch panel common to the upper and lower substrates and the adhesive agent to shield a light leakage,
wherein the light-shielding layer is an adhesive agent bonding the upper and lower substrates to each other.

2. The single unit liquid crystal display touch panel of claim 1, wherein the light-shielding layer is formed of opaque ink.

3. The single unit liquid crystal display touch panel of claim 1, wherein the light-shielding layer is formed of an opaque dielectric.

4. The single unit liquid crystal display touch panel of claim 1, wherein the upper and lower substrates have a viewing area and a dead space, and wherein the touch panel further comprises;
first and second transparent electrodes on facing sides of the upper and lower substrates, respectively, and
at least one electrode in the dead space.

5. The single unit liquid crystal display touch panel of claim 4, wherein the at least one electrode is formed of a light-shielding material.

6. The single unit liquid crystal display touch panel of claim 4, wherein the at least one electrode is formed of an opaque metal.

7. The single unit liquid crystal display touch panel of claim 4, wherein the at least one electrode has a width of about 0.1 to 1.3 millimeters (mm).

8. The single unit liquid crystal display touch panel of claim 1, further comprising:
an upper polarizing plate over the liquid crystal display panel; and
a lower polarizing plate under the liquid crystal display panel.

9. The single unit liquid crystal display touch panel of claim 1, further comprising a case supporting the touch panel and the liquid crystal display panel.

10. The single unit liquid crystal display touch panel of claim 9, wherein an upper part of the case shields the touch panel except for a viewing area of the touch panel.

11. A single unit liquid crystal display touch panel, comprising:
upper and lower touch panel substrates having a viewing area and a dead space around the viewing area, the upper and lower touch panel substrates facing into each other, wherein the upper and lower touch panel substrates are disposed on a liquid crystal display panel;
a polarizing plates between the lower touch panel substrate and the liquid crystal display panel;
first and second transparent electrodes on facing sides of the upper and lower substrate, respectively, at least one metal electrode in the dead space;
an adhesive agent of a light-shielding material between the upper and lower substrates for bonding the upper and lower substrates; and
a light-shielding layer disposed exclusively on the entire sidewalls of the upper and lower touch panel substrates, the adhesive agent to shield a light leakage and the polarizing plate, wherein the entire sidewalls are an entire exterior edge surface common to the upper and lower touch panel substrates, the adhesive agent and the polarizing plate,
wherein the light-shielding layer is an adhesive agent bonding the upper and lower substrates to each other.

12. The single unit liquid crystal display touch panel of claim 11, wherein the metal electrode has a width of about 0.1 to about 1.3 millimeters (mm).

* * * * *